(12) United States Patent
Kenttälä et al.

(10) Patent No.: US 8,654,127 B2
(45) Date of Patent: Feb. 18, 2014

(54) METHOD, DEVICE ARRANGEMENT AND COMPUTER PROGRAM PRODUCT FOR PRODUCING IDENTITY GRAPHS FOR ANALYZING COMMUNICATION NETWORK

(75) Inventors: Jani Kenttälä, Kiiminki (FI); Marko Laakso, Oulu (FI); Jyrki Huhta, Oulu (FI)

(73) Assignee: Clarified Networks Oy, Oulu (FI)

( * ) Notice: Subject to any disclaimer, the term of this patent is extended or adjusted under 35 U.S.C. 154(b) by 1064 days.

(21) Appl. No.: 12/414,960

(22) Filed: Mar. 31, 2009

(65) Prior Publication Data
US 2009/0244069 A1 Oct. 1, 2009

(30) Foreign Application Priority Data
Mar. 31, 2008 (EP) ..................... 08153785

(51) Int. Cl.
*G06T 11/20* (2006.01)
(52) U.S. Cl.
CPC ............. *G06T 11/206* (2013.01); *G06T 11/203* (2013.01)
USPC ...................... 345/440; 345/440.1; 345/440.2; 345/441; 345/442; 345/443; 370/241; 370/254; 370/255
(58) Field of Classification Search
CPC ............................ G06T 11/206; G06T 11/203
USPC ................... 370/241, 254–255; 345/440–442
See application file for complete search history.

(56) References Cited

U.S. PATENT DOCUMENTS

| | | | |
|---|---|---|---|
| 6,286,047 B1 | 9/2001 | Ramanathan et al. | |
| 6,336,138 B1 | 1/2002 | Caswell et al. | |
| 6,377,987 B1 | 4/2002 | Kracht | |
| 6,396,845 B1 | 5/2002 | Sugita | |
| 6,711,171 B1 * | 3/2004 | Dobbins et al. | 370/400 |
| 7,483,379 B2 * | 1/2009 | Kan et al. | 370/237 |
| 8,077,718 B2 * | 12/2011 | Mortier et al. | 370/392 |
| 2002/0131369 A1 * | 9/2002 | Hasegawa et al. | 370/241 |
| 2003/0072270 A1 * | 4/2003 | Guerin et al. | 370/254 |
| 2004/0141507 A1 | 7/2004 | Michel | |
| 2004/0199627 A1 * | 10/2004 | Frietsch | 709/224 |

(Continued)

FOREIGN PATENT DOCUMENTS

WO 01/14989 3/2001

OTHER PUBLICATIONS

Finnish Search Report dated Oct. 2, 2008, from corresponding Finnish application.

*Primary Examiner* — Jin-Cheng Wang
(74) *Attorney, Agent, or Firm* — Young & Thompson

(57) ABSTRACT

A method, a device arrangement and a computer program product for examining and analyzing the functioning of a communication network. In one or more taps of the examined communication network there is a network probe which examines communication packets flowing in the communication network via a tap and searches for identities and their relations from their header information. Identities and relations between them are used to create an identity flow which is used to create an identity graph for describing the operation of the communication network. A network probe(s) sends all or a part of the data of the traffic of the communication network it has collected or analyzed to a supervisor unit. The data is sent according to previously given instructions or by a request sent by the supervisor unit. The identities and relations between them to be included in the identity graph are chosen according to predetermined modifiers.

27 Claims, 6 Drawing Sheets

(56) References Cited

U.S. PATENT DOCUMENTS

Figures 1, 2:
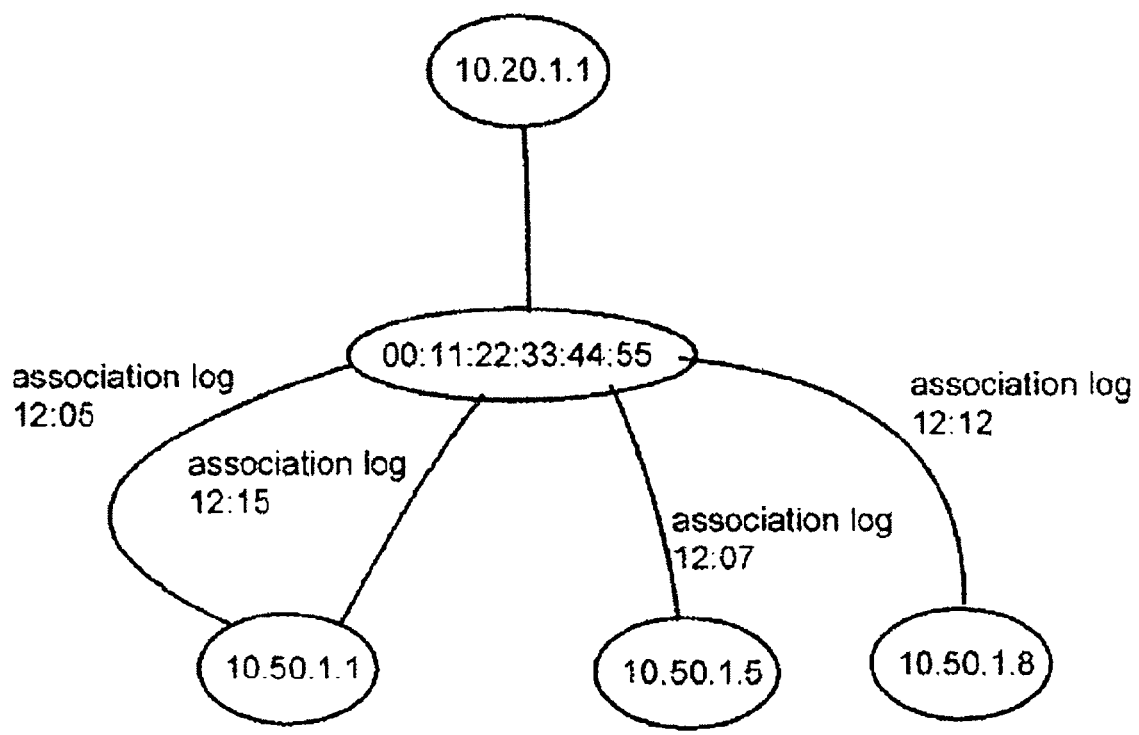

| | | | |
|---|---|---|---|
| 2005/0041676 A1* | 2/2005 | Weinstein et al. | 370/401 |
| 2006/0242543 A1* | 10/2006 | LaVigne et al. | 714/776 |
| 2006/0268739 A1* | 11/2006 | Garcia et al. | 370/254 |
| 2007/0177600 A1 | 8/2007 | Suzuki et al. | |
| 2007/0263553 A1* | 11/2007 | Bharali et al. | 370/254 |
| 2007/0297349 A1* | 12/2007 | Arkin | 370/255 |
| 2008/0031141 A1* | 2/2008 | Lean et al. | 370/241 |
| 2008/0126559 A1* | 5/2008 | Elzur et al. | 709/232 |
| 2008/0183853 A1* | 7/2008 | Manion et al. | 709/223 |
| 2008/0222287 A1* | 9/2008 | Bahl et al. | 709/224 |
| 2009/0097418 A1* | 4/2009 | Castillo et al. | 370/255 |

* cited by examiner

| SRC/DST L3 | SRC/DST L2 | Base station | Time |
|---|---|---|---|
| 10.20.1.1 | 00:11:22:33:44:55 | 10.50.1.1 | 12:05 |
| 10.20.1.1 | 00:11:22:33:44:55 | 10.50.1.5 | 12:07 |
| 10.20.1.1 | 00:11:22:33:44:55 | 10.50.1.8 | 12:12 |
| 10.20.1.1 | 00:11:22:33:44:55 | 10.50.1.1 | 12:15 | ations. The identity is often marked with numbers or letters or combinations thereof.

METHOD, DEVICE ARRANGEMENT AND COMPUTER PROGRAM PRODUCT FOR PRODUCING IDENTITY GRAPHS FOR ANALYZING COMMUNICATION NETWORK

The invention relates to a method, device arrangement and computer program product for recognizing and analyzing the internal connections of the tap and the connections between taps in the packet connected communication network, in which method there are means in the communication network, which means can register and store connections detected in the communication network.

PRIOR ART

Understanding how the modern communication networks function is challenging even for network experts. Especially the functioning of the network devices which is complicated and often open to interpretations and the complex data chains of the different network services are difficult to understand. There are no suitable tools for solving failure situations quickly and thoroughly and many experts have to resort to guesswork and assumptions.

Typically the identities of the communication network are studied with active methods. In these, queries are sent to the communication network with the services provided by the network and based on the answers to these queries, models about the functioning of the communication network are formed. In passive methods, the used source material is the observations of the network traffic. These observations are stored for later examination or analysis.

Patent publication WO 01/14989 describes an arrangement and a method which associates a network user to some network address. The method uses probes which observe logins. The method charts MAC (Media Access Control), IP (Internet Protocol) and other addresses related to users. A meta-directory is created of the results and it is used to the maintenance of the network. The method needs an active SNMP (Simple Network Management Protocol) package to work. Further, the method is confined to tracing the activity of the users, that is, logins and logouts, so its use for observing the other functions of the network is limited.

In patent publication US2004/0141507 a method and a device are presented for controlling IP connections in user-specific communication network. In this publication a database is made of network users and their information. IP address and user relation is observed by an active proxy server.

In patent publication U.S. Pat. No. 6,396,845 is described the use of the network monitor connected to a communication network router to direct network polling traffic to less used network nodes. The network monitor works actively by sending data packets.

The solutions provided by known techniques to study the functioning of the communication networks contain many disadvantages.

Generally the problems of the previous solutions are related to the limited use of methods and the insufficient data gathered by them. When using these methods to study communication networks there is a danger of misinterpretations, additional network problems and in the worst cases security breaches.

The use of active methods gives a quick overview of the status of the communication network. But because network identities are changing and have changed, it would be useful to know what has happened before. In addition, active methods in themselves can change the functioning of the network and burden the network.

Problems with the previous methods can be caused by that the network identity information is not necessarily permanent. For example the contents of the ARP tables (Address Resolution Protocol) expire. If the inspected identity has not made any traffic within a certain period of time the devices remove usually automatically records relating to that identity. Similarly for example DNS records (Domain Name System) relating to IP identities can expire or be contaminated. Also the IP identities of different devices often change. If an automatic IP address distribution (DHCP, Dynamic Host Configuration Protocol) is in use in the communication network, the devices can get different addresses depending on the situation. Nothing proves that a certain device or an Ethernet address would get the same IP address at different times or at the same IP address would always refer to the same device.

The information describing the relationships of the identities can be dependent on the place. For example, there is a relation between IP address 10.10.10.2 and Ethernet address 11:22:33:44:55:66 in the network A whereas in the network B the same IP address has a relation to Ethernet address 66:55:44:33:22:11 because a router changes the Ethernet address of the observed packet when routing the packet from one network to another. Therefore conventional assumptions about the stability of the identity relations are not sufficient for analyzing the communication networks.

The conventional methods get into trouble also when the target is a communication network where connections are made with different techniques. Such is for example a speech connection network where connections between the communication devices are implemented with cables, wireless local area connections, mobile phone connections or the Internet calls or combinations thereof.

A tap is a sensor in the communication network whose traffic is gathered up for analyzing. Tap has a physical and a logical location. Thus taps can be situated in four different ways. They can be physically and logically in the same place. They can be physically in a different place but logically in the same place. For example, two taps observe two different nodes in the same subnetwork. They can be physically in the same place but logically in different places. For example one communication cable is used by several virtual local area networks (VLAN) whereby the taps observe the same cable but each its own virtual network. They can also be logically and physically in different places. This kind of situation is for example an organization whose different subnetworks are observed from different places.

Data storage is a place or a device where information gathered by tap or taps is collected and saved. The information gathered by taps can also be recorded to either one or more places. The taps can be connected to same storage especially when an arrangement is used where the taps are physically in the same but logically in different places. The combination of a tap or taps and a storage is a logical unity which is called a network probe. A network probe can be a physical device or it can be implemented by a computer as a computer program product.

Identity is any identification data relating to data processing and especially to data transfer. The identity can be for example an Ethernet address, an IP address, an Internet name, a device register name, a nickname, a home network name, an e-mail address, an SIP-URI (Session Initiation Protocol—Uniform Resource Identifier) or the like. The identity can be one device, a part of the device or many inter-related devices. There can be can be none, one or more relations to other identities between identities. For example Ethernet address 11:22:33:44:55:66 can be related to IP address 10.10.10.1 and to IP address 10.20.10.1. Identities and the relations between them can change.

Identity flow describes identities and their relations and changes relative to time and place of connections of the communication network investigated from one or more taps. An identity flow can be complete description of the communication network and its function or samples of the connections of the communication network by some chosen rules.

Connection is an event, packet, process, stream or the like travelling in the communication network which has header information (headers), which describes and defines the connection. These headers contain identities and their relations.

Identity graph is a graphical presentation of the relations of the identities. The identities of the different places and devices of the communication network are marked in the identity graph, and those identities, which have some kind of relation, are connected to each other. The identity graphs describing the same system can look different depending on where and when the system is observed. Specific kind of identities or their relations can be chosen to an identity graph.

The messages and events that are transported in communication networks generally have source and destination addresses. In general, source and destination addresses are layered. Typically lower layer addresses change when a packet moves from one network to another whereas upper layer addresses remain unchanged. Because of the layering of the identification data and their changes, recognizing the original source and destination of the message can be difficult.

A packet connected network is used as an example of layering the message in which network messages are usually called packets.

The OSI (Open Systems Interconnection) model can be used for naming the layers of the packet which model contains seven layers. The first, which in figures usually is the lowest layer, is a physical layer. This is called L1. The second layer is a data link layer, L2, which executes the addressing between local network devices. This is used for example by Ethernet. The third layer is a network layer, L3, which executes routing and destination finding from network. This is used for example by IP. The fourth layer is a transport layer, L4, which is responsible for the arrival of the packets and their right order. This is used for example by TCP (Transmission Control Protocol). The fifth layer is a session layer, L5, which manages the multiplexing of several sessions going in one link. The sixth layer is a presentation layer, L6, which transforms data to a form which is useful for user, like for example changing data transported in network to ASCII characters. The seventh layer is an application layer, L7, which applications defined by the user utilize. This is used for example by http and ftp. There are also other models for naming the layers.

The view of the services of the network about relations of the identities is often insufficient. If, for example, a fault situation, which occurred the previous day, is analysed, the information about identities and their relations provided by the network can be different compared to the moment the flaw situation took place. Merely repeating the flaw situation can be impossible if it is not known exactly what has caused the problem. For the thorough investigation of the problem situation, detailed information about the moment the flaw situation took place has to be available.

The relations of the network identities can change in relation to the place. Therefore it has to be concluded for example that the relation pair X of tap A relates to the relation pair Y of tap B. Following the events related to a network device can be impossible if the relations between identities from different taps are not understood. As an example of the changes of the relations between identities is a situation where all events where the source is the Ethernet address, that is, the identity, 00:11:22:33:44:55, are to be examined. The network routers change Ethernet addresses of the packets that proceed in the network. Therefore there is no use to examine only packets containing the address 00:11:22:33:44:55 but to examine all events relating to the identity. In that way, it can be discovered, for example, that the relation pair of identities 00:11:22:33:44:55-10.10.20.1 corresponds on the other side of the router relation pair 00:11:22:66:77:88-10.10.20.1.

Different services can have different conception of network identities. For example DNS-name service can give DNS address 'server.home' as the address corresponding to IP address 10.20.30.40, and local network name server can give for the same IP address identity 'Pete's WWW-server'.

In communication networks there are different services which bind network devices' network addresses to some other form. For example, DNS name service changes IP address (192.0.32.166) of the device to a DNS address consisting text characters (www.example.com). Or for example the device announces that its name in local area network is 'Pete's picture directory' or shares the printer connected to it under the name 'Pete's printer'

Identities can change depending on time. For example, DNS address relating to IP address 198.105.232.4 may have been www.example.com in 2004, and in 2007 the IP address corresponding to the same DNS address is 192.0.34.166. This can also happen the other way around and the same IP address can relate to different DNS addresses even within a short period of time. Even if the DNS address of the IP address should change, the other identities of the device such as the local area network name can remain unchanged. Changing of the relations of the identities over time can be perfectly normal with some uses of communication networks like for example with dynamic IP, or it can relate to changes caused by the user, network administrator or flaw situations, for example.

The identities of the devices connected to communication network are examined typically with active methods. For example, the relation between IP address and DNS address of the device can be decoded by sending a query about that IP address to the DNS service. Respectively the relation between Ethernet addresses and IP addresses is decoded by an ARP query or from ARP records which are in the memories of the devices at the moment. The more complicated local relations between Ethernet and IP identities of the same device are decoded for example by installing some active agent package which can be for example an SNMP service. The active methods can change the functioning of the communication network by means of their own functioning, slow it down and in the worst case cause flaw situations or security breaches by their own actions.

SUMMARY OF THE INVENTION

A method and device arrangement according to the invention can significantly reduce the drawbacks and disadvantages of known techniques.

The objectives of the invention are achieved by a method, device arrangement and computer program products, which are characterized in what is set forth in the independent claims. Some preferred embodiments of the invention are presented in the dependent claims.

In the invention, a communication network is examined by creating an identity flow from the traffic of the communication network and by means of this identity flow an identity graph is created.

Method

In the method according to the invention there are means in the packet connected communication network which means are capable of registering and storing connections detected in the communication network. The method recognizes relations between and internal relations of the taps in the packet connected communication network. A tap is situated in some device of the communication network. The invention is characterized by that in the method the header information connected to the connections of the communication network is examined. From this header information identities and relations between the identities are searched. These identities and relations between them can be modelled, saved or visualized as one or more identity flows. Identity flow, identity flows or parts of them can be presented as an identity graph to analyze the function of the communication network.

The invention makes it possible to describe the state of the communication network, its identities and the relations between them extensively and diversifiedly instead of unbalanced and single case description. The basic idea of the invention is that for making the identity graph there is a service in the examined communication network which service collects the real traffic of the communication network from one or more taps. This service collects and examines the connections of the communication network. These connections are files, events, processes or the like which flow in the communication network and have header information. The header information describes and defines the connection. Identities and relations between identities are searched from the connections. These identities and relations between them or parts of them are saved as an identity flow. The identity flow is used for creating an identity graph which can be used for analyzing the functioning of the communication network. Preferably the service examining the connections of the communication network is passive but identities and their relations acquired by other means can be used also for making an identity graph.

Connections of the communication network are observed by a network probe. A network probe is either a physical device which can be connected to communication network or a computer program product stored in memory of device which belongs to the communication network being examined. The network probe searches for header information connected to connections from the communication network, and from the header information the tap searches for identities and relations between them and saves at least a part of the found data to data storage.

The network probe has means for analyzing the data it has collected and means for sending the data or a part of the data it has collected or analysed to a supervisor unit. The analysis of identities and their relations can be made by the network probes for each tap. The analysis made by the network probes can be for example that some predetermined information like for example certain addresses is searched from connections flowing through the tap, or observations are executed at predetermined moments. In the analysis made by the network probes, such data that are not necessarily included in the connections of the communication network can also be added to the collected data, for example. Such information can for example be observation time and place. An identity flow is formed of the observations.

The network probe sends at least a part of the data it has collected and analysed to the supervisor unit. The sending of the data is done according to predetermined rules or by the request of the supervisor unit. Such rules can be for example schedule or amount or quality of the collected data. Preferably the network probe is capable of storing and conserving the data it has collected. In this way the data can be sent when the operation of the communication network is not disturbed.

A supervisor unit is either a physical device or a computer program product. The supervisor unit is preferably outside the examined communication network. In this way it does not disturb the communication network being examined. The final analysis of the collected data is executed in a supervisor unit. The final analysis consists for example of combining the data collected from different sources and creating an identity graph. Supervisor unit can use as sources identity flows from network probes or data sent by other services, log files, descriptions of connections or the like. A data structure is made from the information obtained from the connections of communication network which data structure is used by the supervisor unit to create an identity graph.

The identities and their relations which are situated in the identity graph are chosen according to predetermined modifiers. These modifiers define those objects in the communication network which are the object of interest. Modifiers can be for example point in time, time interval, identities related to some specific device or some specific kind of identities or some specific kind of relation between identities. For example, an identity graph is created where identities are IP numbers and DNS addresses and relations connecting them. Identity graphs describing the same communication network at different points in time can be presented in sequence whereby a conception of the events of the of communication network events over time is achieved.

The model describing the relations of the network identities is made up of the identity graph. The identity graph can also be built to describe some communication network entity or a part of it or behaviour of them. In the identity graph there can be changes of identities and relations between them in one tap or changes of identities and relations between them between two or more taps. The identity graph can also describe temporal changes of the identities and their relations or temporal changes of the identities and their relations between two or more taps.

Preferably identities in an identity graph are connected in such a way that the types of relations connecting the identities can be distinguished from each other. Similarly, identities can be set in an identity graph so that they can be distinguished from each other. In a complete identity graph there can be several identity nets which do not have to connect to each other.

If the data structure of the supervisor unit does not have required data to create identity graph, or the data of the data structure do no fulfill given modifiers, the supervisor unit makes requests to the network probes for sending data. The supervisor unit can also send a checking request to the network probes so that they would check if they have such data for making the identity graph that the data structure of the supervisor unit does not have.

Every connection detected in a tap and information on layers of a connection combined to the information of other connections creates links between different identities which links and identities can be stored in the data structure. Data from the data structure can be used to form an identity graph.

Identities and their relations found from a connection of a communication network are examined. Mutual relations between identities in a connection are called vertical relations. Source and destination addresses connected to each other are called horizontal relations.

Identity information from different layers is examined in vertical direction of a connection. Vertical examination is done by layers, that is, first is searched preferably L2 identity information. After L2 identity information is checked L3 identity information is searched and so on. From each information, characteristics of the layer can be searched for. In this case, the layers are numbered and named according to OSI model but there are other ways and models to describe layers of a communication packet (IP model). Preferably the connection is searched first for lower layer identities and then for upper layer identities. Identities found from the connection form a vertical relation between them.

The interrelated source and destination addresses of a connection form horizontal links for identities. Horizontal links are achieved for example when connecting source and destination addresses from data storages of network probes. For example source L2 and destination L2 addresses are connected to each other and thus form a horizontal link.

In an identity graph, horizontal and vertical link do not mean directions but previously described relations between layers and source and destination addresses.

Device Arrangement

Method for analyzing internal relations of taps and relations between taps in a communication network according to the invention is executed by a device arrangement which includes means in the communication network which means are able to register and store connections detected in the communication network and search them for identities and links between them. These are saved as an identity flow. The device arrangement is characterized in that it is arranged to create a data structure from identities and relations between identities gathered by mentioned means situated in the communication network and to create an identity graph analysing the functioning of the communication network by using the data of the data structure.

Preferably the device arrangement is arranged to create an identity graph analysing functioning of the communication network on grounds of the modifiers given to it. The modifiers can be for example points in time or certain kind of identities. Based on the modifiers the data structure is searched for identities and their relations that will be forming the identity graph.

If identities and their relations according to the modifiers are not found from the data structure of the device arrangement, the device arrangement has been arranged to send a request concerning the missing data to a device collecting connections of the communication network. The device arrangement is arranged to send a checking request to the device collecting connections of the communication network about whether or not the device collecting connections of the communication network has saved such identities and their relations fulfilling the modifiers which the data structure does not contain.

The device arrangement is arranged to receive and save the data sent by the device collecting connections of the communication network to the data structure.

Computer Program Products

The method according to the invention is implemented by a first and a second computer program product. A first computer program product recognizes relations between and internal relations of the taps in a communication network. The first computer program product is stored in a data storage medium, which is for example a memory. This data storage medium is in some device of the examined communication network. The device is situated in a tap of the communication network or the device itself contains one or more taps. The device has a memory and a processor and first computer program product is loaded in memory and is executed in processor. The processor controls a sensor or sensors which observe packets flowing in the communication network which packets can be detected in taps. The sensors read the header information of packets and search them for identities and relations between them. Found identities and relations between them or a part of them are saved to some data storage medium which is situated in the mentioned device.

The first computer program product has computer program means which are arranged to search in a tap for communication network identities and relations between them from header information of packets relayed in communication network or from descriptions of packets in question. Preferably this search is done passively. The first computer program product produces an identity flow.

The first computer program product also comprises computer program means which are arranged to analyse the information collected about identities and their relations. In the analysis data is for example indexed, information relating to each other is combined or such additional information is added which was not contained in header information or packet descriptions. Such information can be for example the moment of data registration or the registration place. The first computer program product furthermore comprises computer program means which are arranged to save to data storage at least a part of the identities and their relations it has found. The first computer program product includes computer program means to remove needless or obsolete data from the data storage if the storage space is about to fill. The first computer program product includes computer program means to remove from the data storage the data sent to the supervisor unit.

The first computer program product comprises computer program means which are arranged to send gathered data to the supervisor unit either according to predetermined rules or by the request of the supervisor unit. These rules can be for example schedules or when a specific amount data is gathered or when some specific event occurs. The request sent by the supervisor unit can include for example events detected in some specific time interval or some specific kind of identities and their relations.

A second computer program product analyses relations between and internal relations of the taps in a communication network. The second computer program product is stored on a data storage medium which is for example a memory. The device that uses the second computer program product has a memory and a processor and the second computer program product is loaded into the memory and is executed in the processor. The processor controls the input functions of the data processing device as well as the user interface of the data processing device which user interface is used to give instructions to the data processing device. According to the instructions the data processing device reads into its memory identities and their relations of the communication network being examined from some data storage medium. According to the instructions, an identity graph is formed of the identities and their relations in the data processing device. The data processing device presents this identity graph with some appropriate way which is for example a display screen. The produced identity graph can be saved to some data storage device.

This data processing device can preferably be outside of the examined communication network. The second computer program product consists of the computer program means for creating an identity graph for analysing the functions of a communication network.

The second computer program product further consists of computer program means which are arranged to receive the data of identities and their relations of the examined communication network sent by a device storing the connections of a communication network. The device storing the connections of a communication network can be a network probe implemented by the first computer program product or some other service which examines the functioning of the communication network or to which data or descriptions about the operation of the communication network have been stored.

The second computer program product further consists of a computer program means for creating a data structure from the identities and their relations of the examined communication network and possibly from other information connected to them. Other information connected to the identities and their relations can have been achieved for example from an analysis made in the network probe or from log files.

The second computer program product also consists of computer program means which are arranged to receive modifiers which define which identities and their relations are to be included to the identity graph to analyse the communication network. These modifiers can be for example some time interval or some specific kind of identities which have been detected in the communication network. The modifiers can be fed into a computer program product through a user interface of the data processing device containing a computer program product. The modifiers can be fixed so that the second computer program product produces only specific kind of identity graphs.

The second computer program product consists of computer program means which are arranged to send a request to device storing communication network connections for receiving missing data if the data structure does not contain identities and their relations which accord with the modifiers. The second computer program product consists of computer program means which are arranged to send a checking request to a device storing communication network connections. In the checking request a request is submitted to the device storing communication network connections to check if its data storage contains such identities and their relations which fulfill the modifiers and which are not in the data structure. This device storing communication network connections can be the first computer program product.

The second computer program product consists of computer program means to create an identity graph analysing a communication network from data stored to the data structure. The identities and their relations which are included into the identity graph are selected according to the given modifiers. An identity graph can present temporal and regional changes of the identities and relations between them of a communication network in one tap or between more taps. It is also possible to create several identity graphs whose modifiers are different for different identity graphs. So for example a series of identity graphs is accomplished which identity graphs describe the state of the communication network at different points in time. The identity graphs can be presented through some user interface with that data processing device containing the second computer program product.

The second computer program product can also create an identity graph where the identities are connected to each other in such a way that the types of relations between them can be distinguished from each other. For example, horizontal relations are presented by a dotted line and vertical relations by a continuous line.

The first computer program product implements a network probe and the second computer program product implements a supervisor unit.

Advantages

The invention has the advantage that it gives a user a change to outline the relations of the communication network identities to each other temporally and regionally in a form that can be understood quickly. Further, changing the way of inspection is fast. The invention is also safe for the use of network and it does not hinder normal use of the network.

The invention has also the advantage that it is not dependent on some specific environment. It can be used to study communication systems where several different communication protocols and methods are used. This can be for example a system where calls are relayed both via phone networks and the Internet.

In addition, the invention has the advantage that it helps to clear the flaw situations of a communication network. With it, places and events in the network that cause data security and communication problems can be found. Flaw and problem situations can also be predicted by means of the invention.

Furthermore, the invention has the advantage that when investigating data breaches or similar occasions the invention helps to form a general view of the situation where unambiguous evidence can be found.

With the help of the invention the operation of the network can be quickly followed. This reduces the manual examination of the log files.

Yet another advantage of the invention is that the functioning of the network can be enhanced and optimised by the help of it when the real use of the network and generation of problem situations such as congestion or breaking of connections can be followed.

EXAMPLES

Figure 3:
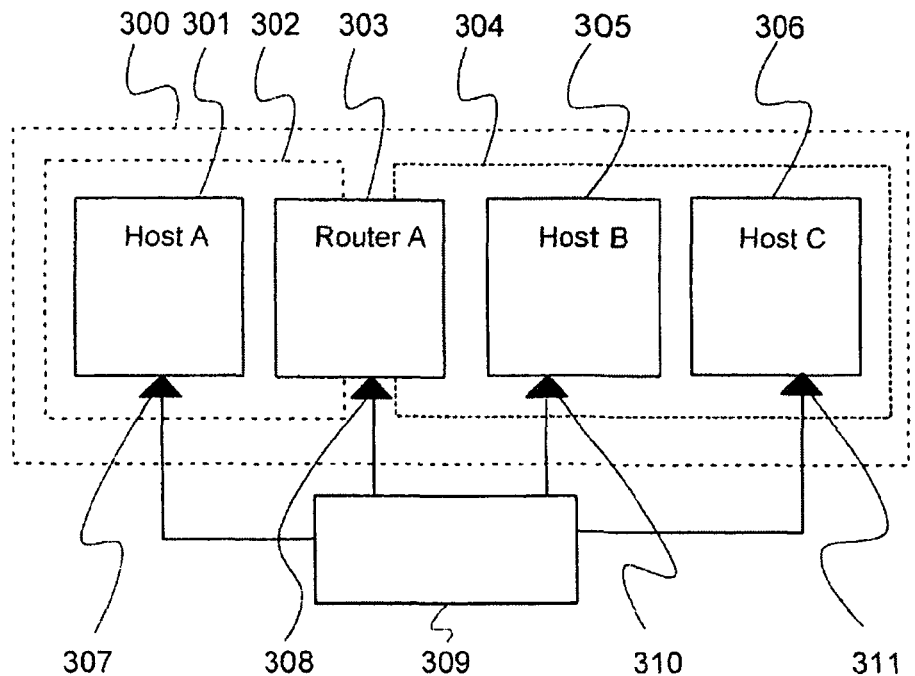
Figure 5:
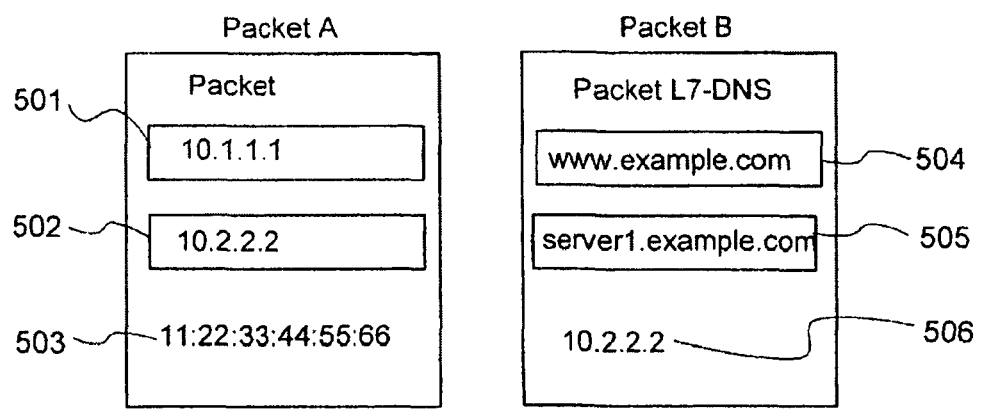
Figure 4:
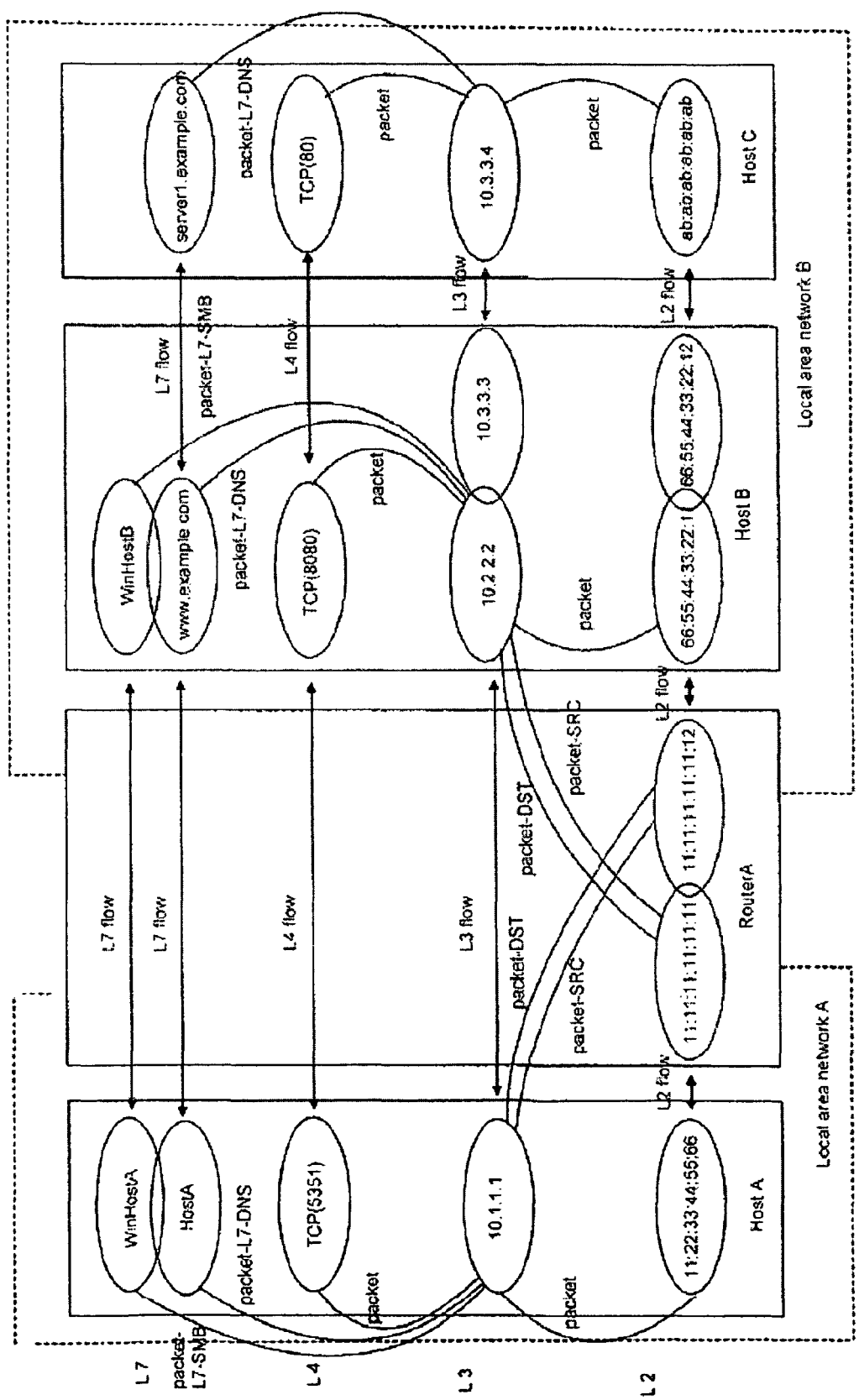
Figure 6:
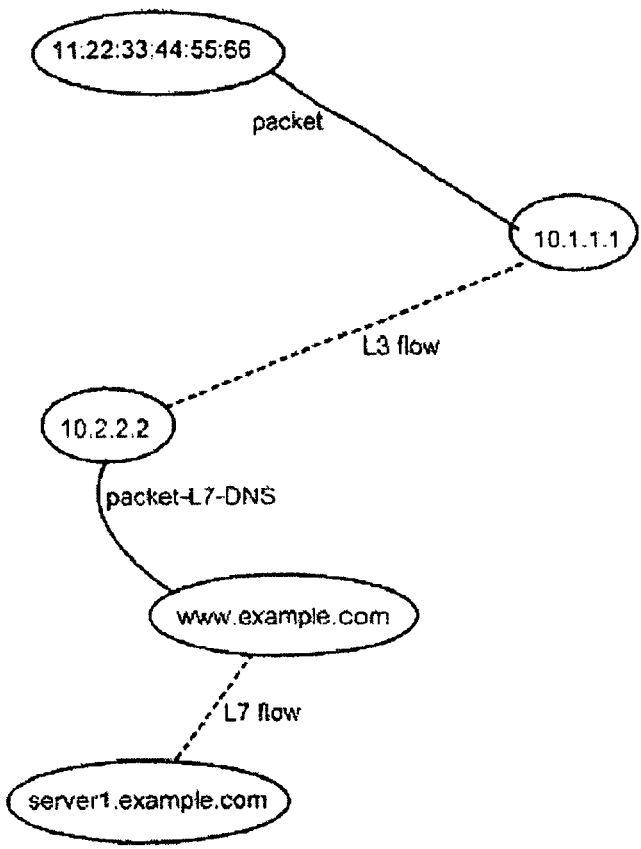
Figure 7:
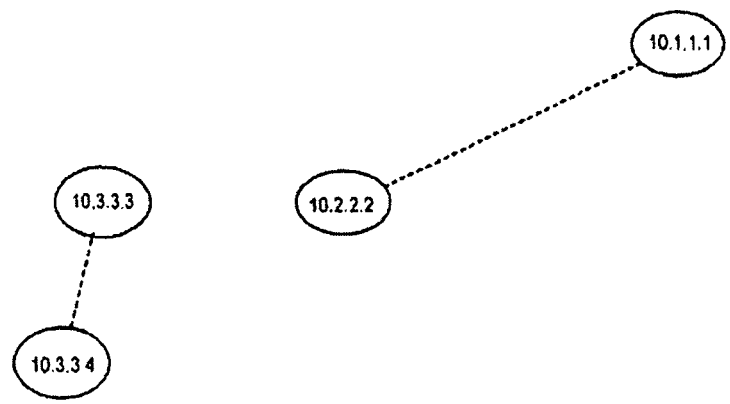
Figure 8:
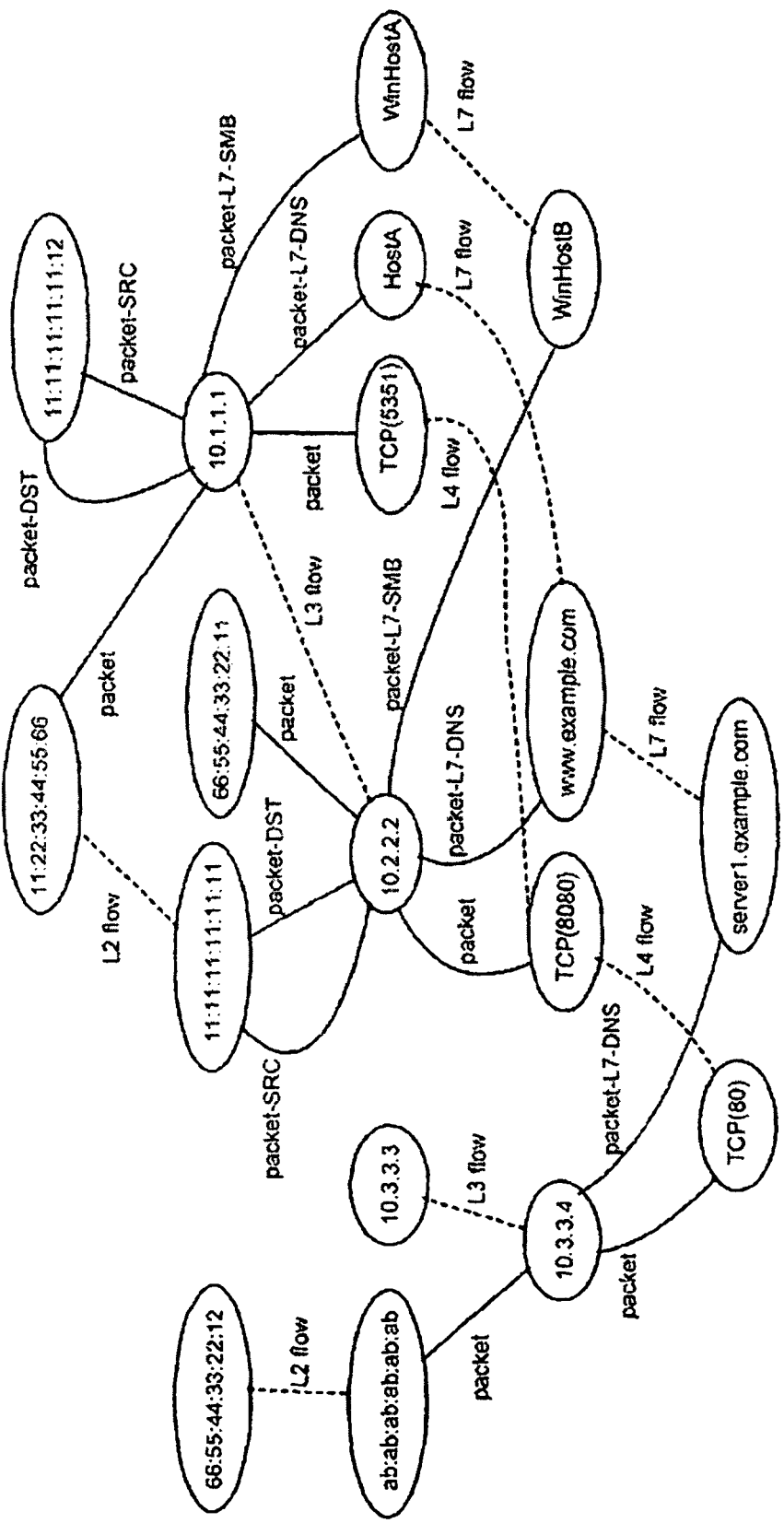
Figure 9:
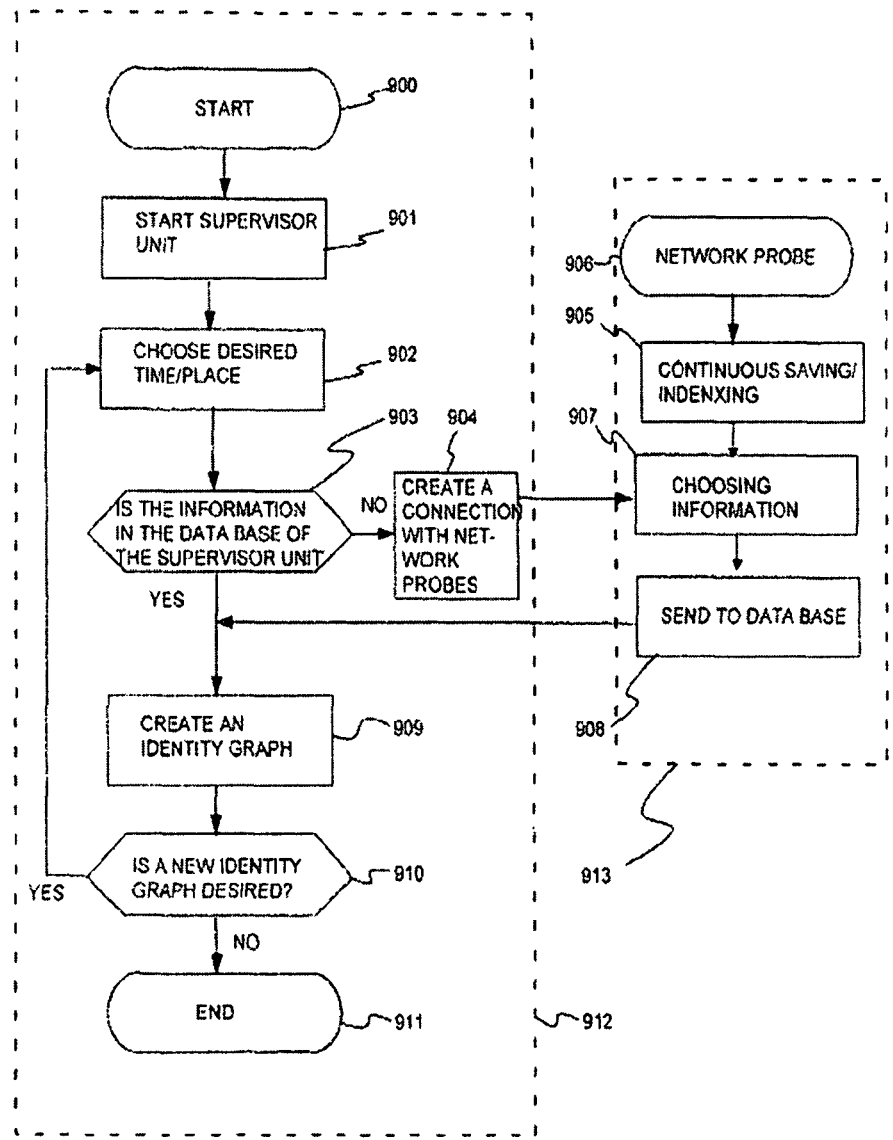

In the following the invention will be described in detail. Reference will be made to the accompanying drawings, in which FIG. 1 shows a table which contains exemplary identities and their relations, FIG. 2 shows an identity graph produced from the table presented in FIG. 1, FIG. 3 shows an example of a communication system, FIG. 4 shows an example according to FIG. 3 at the level of identities, FIG. 5 shows an example of communication packets of a communication system according to FIGS. 3 and 4, FIG. 6 shows an example of an identity graph describing a communication system according to FIGS. 3 and 4, FIG. 7 shows a second example of an identity graph describing a communication system according to FIGS. 3 and 4, FIG. 8 shows a third example of an identity graph describing a communication system according to FIGS. 3 and 4 and FIG. 9 shows an exemplary flow chart of the method according to the invention.

In the following the functioning of the invention is represented by means of some examples.

In the first example the invention is used to study the behaviour of a device between different base stations in a wireless communication network. A network probe examines the connections generating in a communication network and in the analysis IP packets and association logs connected to the studied device have been found. An association log is a description of a connection event of a communication network according to the invention which description can be searched for identities. In a typical association log the base station announces its L3 address, L2 address of the device associated to the base station and the time of the association event.

Analysis of the connections, where identities and relations between them are searched for can be done in part in a network probe. The collected data will be sent onward to a supervisor unit where the analysis is continued. An identity graph is produced in the supervisor unit. In the analysis, an identity flow is created from the identities and their relations. The identity flow can be saved in full or partially as a data structure from where the identities in which a user is interested and other identities connected to that or those identities will be searched for when creating an identity graph.

Five connections have been examined in the example case according to FIG. 1: one IP packet and four association logs. When creating an identity graph source would be L3 address (IP address) of the base station, the destination L2 address of the device associated to the base station, and the defining factor of the link the time.

From the IP packet L2 and L3 addresses of the device associated to the base station have been received which addresses in this example are 00:11:22:33:44:55 and 10.20.1.1. If for example it is wanted to find out with which base station the device the L3 address of which is 10.20.1.1 is associated, the following links between L2 address of device and L3 address of the base station are found when examining association logs and the IP packet:

10.20.1.1 [ip]->00:11:22:33:44:55 (IP packet)
   00:11:22:33:44:55   [base   station   association 12:05]->10.50.1.1
   00:11:22:33:44:55   [base   station   association 12:07]->10.50.1.5
   00:11:22:33:44:55   [base   station   association 12:12]->10.50.1.8
   00:11:22:33:44:55   [base   station   association 12:15]->10.50.1.1

These links can be presented in a table according to FIG. 1. In the first column, SRC/DST L3, there is L3 address of a device associated to a base station. In the second column, SRC/DST L2, there is L2 address of a device associated to a base station. In the third column, Base station, there is L3 address of a base station. In the fourth column, Time, there is the point in time when the device associated to the base station has been connected to the base station the address of which is in the third column.

The information gathered from association logs and the IP packet of the example of FIG. 1 can placed to an identity graph which is presented in FIG. 2. From it can be seen the IP numbers of the base stations be seen from that. These links can be considered vertical links.

In the following the creation of an identity graph according to the example in FIG. 1 is described. The creation is executed in a supervisor unit and the data needed for the identity graph are stored to the data structure. For the sake of clarity of the example the identities and their relations refer to the connection from which the network probe has found them instead of the data structure.

The link from identity 10.20.1.1 to identity 00:11:22:33:44:55 is found from the IP packet. From the first association log can be found a link which connects identity 00:11:22:33:44:55 and identity 10.50.1.1. From there is also found the time, 12:05, for the link in question. On grounds of this information a first identity 10.20.1.1 is placed into the identity graph. Then a second identity 00:11:22:33:44:55 is added to the identity graph. On grounds of the information gained from the IP packet the first identity 10.20.1.1 in the identity graph is connected to the second identity 00:11:22:33:44:55 by a line describing the relation between them. The third identity 10.50.1.1 found from the first association log is added to the identity graph. According to the information received from the first association log the second identity 00:11:22:33:44:55 is connected to the third identity 10.50.1.1 by a line describing the relation between them which line can be given the attribute 12:05.

From the second association log is found a fourth identity 10.50.1.5 together with a link connecting the second identity 00:11:22:33:44:55 and the fourth identity 10.50.1.5 as well as the time 12:07 for the link in question. Based on of this the fourth identity is added to the identity graph and the second identity 00:11:22:33:44:55 is connected to the fourth identity 10.50.1.5 by a line describing the relation to which line the attribute 12:07 can be given.

From the third association log is found a fifth identity 10.50.1.8 together with a link connecting the second identity 00:11:22:33:44:55 and the fifth identity 10.50.1.8 as well as the time 12:12 for the link in question. The fifth identity 10.50.1.8 is added to the identity graph and the second identity is connected to the fifth identity by a line describing the relation, which line can be given the attribute 12:12.

From the fourth association log is found a third identity 10.50.1.1 together with a link connecting the second identity as well as the third identity and the time 12:15 for the link in question. Because the third identity is already added to the identity graph, the second and the third identity are connected by a line describing the relation, which line can be given an attribute 12:15. Thus, the second and the third identity of the identity graph are connected by two lines describing the relation, which lines have attributes 12:05 and 12:15.

As a result the identity graph according to the FIG. 2 is achieved. This identity graph describes to which base stations the device the L3 address of which is 10.20.1.1 is associated at different times.

In the second example the desire is to examine the function of a packet connected communication system is wanted to examine. In it the devices are relying packets. This communication system 300 is described in FIG. 3. The communication system consists of two local communication networks which are LAN A 302 and LAN B 304. In the communication network LAN A there is a device Host A 301 and in the communication network LAN B there are devices Host B 305 and Host C 306. The communication networks LAN A and LAN B are connected by a router named Router A 303. In the devices in the communication systems, including the router, have been inserted network probes. Network probe A 307 has been inserted in the device Host A, network probe B 308 has been inserted in the router Router A, network probe C 310 has been inserted in the device Host B and network probe D 311 has been inserted in the device Host C. These network probes examine passively the identity flow going in the communication system, that is, they register identities and relations of identities from communication packets. Supervisor unit 309 collects the data registered by the network probes and stores them in the data structure. In the case according to the example the supervisor unit is outside of the studied communication system 300.

FIG. 4 presents in more detail the communication system described in FIG. 3. There identities and their relations placed in layers according to OSI model and in devices in the communication system to which identities are connected have been presented. In FIG. 4 four vertical layers, L2, L3, L4 and L7, of the communication network packets have been presented. The identities have been presented as ellipses inside of which the name of identity has been written. Lines connecting the identities describe their relations. Horizontal relations, or relations which source and destination addresses form, are marked in FIG. 4 as lines where both ends of lines have an arrowhead. Next to the relation has been written what kind of relation it is.

In FIG. 4 a situation has been presented where different identities of the network can be described being situated vertically layered, the relations of which identities are changing horizontally depending on where the point for the network situation observation is. In FIG. 4 identities connected vertically to different data layers of the communication network and their horizontal changes between different parts of the network can be distinguished.

In FIG. 5 there are examples of the communication packets going in the communication system presented in FIGS. 3 and 4 which packets have been registered by the network probes. The packets have been simplified for the sake of clarity. These packets are packet A and packet B. The network probe has found from packet A source address 501 which is 10.1.1.1 and destination address 502 connected to that, which is 10.2.2.2 as well as Ethernet address 503 relating to the source address, which Ethernet address is 11:22:33:44:55:66. From packet B the network probe has found source address 504 which is www.example.com, and destination address 505 connected to that which is server1.example.com as well as IP address 506 relating to source address, which IP address is 10.2.2.2. Preferably network probes store the data they find into their data storage from where it is sent to a supervisor unit for example either by a request sent by the supervisor unit or by schedule or when some predetermined amount of data has been collected.

In FIG. 6 there is an identity graph produced from the connections presented in FIG. 5. In the data structure of the supervisor unit has been stored the identities and their relations which network probes have found from the connections in question. The storing has been done either by predetermined instructions or by a request sent to the network probes by the supervisor unit. As modifiers of the identity graph may have been for example a certain time interval and the network probes have registered the connections presented in FIG. 5 in time interval in question.

Based on the information from packet B stored in the data structure the supervisor unit places the identities www.example.com and server1.example.com into the identity graph and connects them with a line describing the relation. In this case, a dotted line is used for marking the horizontal relation. The identity 10.2.2.2 is related to the identity www.example.com and that is placed into the identity graph. The relation between them is presented by a line connecting them. Because the identities have a vertical relation, a continuous line is used in this case. Based on the information from packet A stored in the data structure the supervisor unit detects that identities 10.1.1.1 and 10.2.2.2 have a horizontal relation between them. The supervisor unit adds identity 10.1.1.1 to the identity graph and connects this to the previously added identity 10.2.2.2 by a dotted line. The identity 10.1.1.1 has a vertical relation with the identity 11:22:33:44:55:66 in which case the supervisor unit adds the identity to the identity graph and connects it with a continuous line to the identity 10.1.1.1.

In FIG. 7 there is another identity graph describing the communication system according to the example of FIGS. 3 and 4. In this example IP addresses and the relations between them have been chosen as modifiers of the identity graph. In that case the result is two identity networks not connected to each other.

In FIG. 8 there is a third identity graph describing the communication system according to the example of FIGS. 3 and 4. In this identity graph all identities and relations of them presented in FIG. 4 have been collected.

All or at least a part of the identities and their relations found from the registered communication packets are used to form a data structure in the supervisor unit. Data registered by the network probes is sent to the supervisor unit for example in regular intervals or when a predetermined amount of data has been collected or when a request to send data is received from the supervisor unit. The data to be sent can be assorted by time, place or some other modifier.

An identity graph has produced in the supervisor unit by searching the data structure in the supervisor unit for identities and relations between them according to the given modifiers. If subjects according to the given modifiers are not found from the data structure, for example connections registered over some predetermined time interval, the supervisor unit sends a request to the network probes for subjects according to the modifiers. The network probes return subjects according to the request to the supervisor unit which stores them to the data structure and after that the supervisor unit continues to produce the desired identity graph. The supervisor unit can also send a checking request to the network probes about whether or not their data storages contain such identities and relations between them that fulfill the modifiers but that are not in the data structure of the supervisor unit.

The identity graph according to FIG. 8 describes the state of the examined communication system. From it the relations of identities of different devices can be seen quickly.

Adding of the identities is continued until all identities and their relations fulfilling the modifiers have been added or some prerequisite is fulfilled which can be for example the amount of identities in the identity graph or the distance of the identities from the identity which was the source point.

In one embodiment those connections which have been detected over some certain time interval are chosen for making the identity graph. By making identity graphs from different periods of time the behaviour of the examined communication system over time can be seen from them. In another embodiment certain kind of identities or protocols connecting them are chosen for making the identity graph in which case the behaviour of certain parts of the communication system can be seen from the identity graph.

In FIG. 9 has been presented a flow chart describing by way of example the functioning of an embodiment according to the invention. The functioning is described in steps. The functioning can be divided to a supervisor unit 912 and a network probe 913.

In step 900 of FIG. 9 making of the identity graph is started. In step 901 supervisor unit is started which preferably is outside the examined communication system and thus the mentioned communication system does not disturb with its functioning. In step 902 the modifiers based on which the identity graph is desired to be formed are chosen. These modifiers can be for example point in time, time interval, some place in the examined communication system, some identities of the examined communication system or some relations between identities in the examined communication system or a combination of several modifiers.

In step 903 of FIG. 9 it is examined if the data structure of the supervisor unit contains data according to the modifiers chosen in step 902. Data gathered from the examined communication system by the network probes are collected in the data structure. In step 903 the supervisor unit decides if it is possible to create an identity graph according to the modifiers the information of the data structure. If the answer is "YES", the supervisor unit creates the identity graph in step 909. After this it is decided in step 910 if a new identity graph is desired to be created. If the answer is "NO", it is moved to step 911 and the process is stopped (producing identity graphs).

If in step 903 of FIG. 9 it is discovered that there is not enough information in the data structure of the supervisor unit to create an identity graph according to the modifiers chosen in step 902, or the answer is "NO", it is moved to step 904 where a connection to the network probes is formed.

Network probes are situated in the examined communication system so that they are capable of registering and studying its identity flow, that is, the events and identities and the relations of identities flowing in the communication system. Step 906 describes this. In one preferred embodiment the network probes are arranged to continuously store and analyse the identities and their relations. The analysis comprises for example indexing and choosing the data and possibly adding such information which is not found from the events of the communication network such as time and place of registering. Step 905 describes this. In step 907 it can be chosen what kind of information will be sent in the next step 908 to the data structure of the supervisor unit. The information to be sent is chosen for example according to some given criteria or otherwise all registered information is chosen or a certain part is chosen. In step 908 the network probes are arranged to send to the supervisor unit the data they have stored and analysed. This step can be executed either automatically in certain time intervals or when the network probes have collected a certain amount of data or else by the request of the supervisor unit.

In step 904 the supervisor unit makes contact with the choosing of the data collected by the network probes which occurs in step 907. In that case the choosing criteria are the modifiers chosen in step 902. In step 908 the network probe sends to the data structure of the supervisor unit the data chosen in step 907.

In step 909 an identity graph according to the modifiers given in step 902 is created from the updated data structure of the supervisor unit. After this it is decided in step 910 if a new identity graph will be created. If the answer is "NO" it is moved to step 911 and the creating of identity graphs is stopped.

If in step 910 it is desired to create a new identity graph, the answer is "YES" and in that case it is returned to step 902 where modifiers which will be grounds for creating an identity graph are chosen. In one preferred embodiment a forming modifier of an identity graph is some point in time, which point in time will be increased when returning to step 902. In that case the result is a group of identity graphs which describes the behaviour of the examined communication system as a function of time.

In the example presented in FIG. 9 supervisor unit 912 can be implemented by means of the second computer program product and network probe 913 is implemented by means the first computer program product.

Some preferred embodiments of the method and device according to the invention have been described above. The invention is not limited to the above solutions only, but the inventive idea can be applied in many ways within the limits defined by the claims.

The invention claimed is:

1. A method for recognizing and analyzing relations between taps of a communication device in a packet connected communication network and the communication network, comprising the steps of:
gathering traffic information in the communication network with a tap of a communication device connected to the communication network, the tap examining header information of connections of the communication network;
storing the information gathered by the tap in a data storage, the tap connected to the data storage, the tap and the data storage together defining a network probe, the network probe being one of i) a physical device and ii) a computer unit;
observing connections of the communication network with the network probe, each connection travels in the communication network and has header information describing the connection, the header information including an identity of the connection and relations to other identities, wherein the observing the connections comprises the tap i) passively analyzing IP packets and association logs received to the tap, the association logs being a description of an observed connection of the communication network, the description being searchable for identities, from the IP packets and association logs, locating the header information of the observed connections, ii) using the located header information to determine the identities of the observed connections and the relations between the observed connections, and iii) saving at least a part of the located header information, the identities, and the relations to the data storage;
with the network probe, modelling the determined identities and relations as identity flows, the identity flows describing i) the identities, ii) the relations of the identities to the other identities, and iii) identity changes, the identity flows being relative to time and place of the connections; and
using at least some of the identity flows for creating an identity graph for analyzing functioning of the communication network, the identity graph being a graphical presentation of the relations of the identities, with the identities of different places and devices of the communication network being marked in the identity graph, and the relations of the identities to the other identities being marked in the identity graph, the identity graphs describing the communication network depending on from where and when the communication network is observed, wherein the identities and the relations of the identities to the other identities to be included in an identity graph are chosen according to predetermined modifiers, the modifiers defining objects in the communication network which are the object of interest for the analyzing of the communication network.

2. The method according to claim 1, wherein a data structure has been created from the identity flow of the communication network, which data structure is used by a supervisor unit for creating an identity graph, the supervisor unit being outside of the communication network, the supervisor unit using the created data structure to create the identity graph.

3. The method according to claim 1, wherein,
the communication device comprises plural of said tap, the network probe comprising said plural taps, and
the network probe analyzes the identities and the relations of the identities from the traffic information gathered by each of the plural taps.

4. The method according to claim 2, wherein at least a part of the data gathered or analysed by the network probe is sent to the supervisor unit which performs the final analysis.

5. The method according to claim 2, wherein the supervisor unit makes requests to the network probe for sending information when the data structure does not contain needed information for creating an identity graph.

6. The method according to claim 3, the wherein temporal or local changes of the identities and the relations between the identities at the one tap or between two or more of the taps are found out with the identity graph created by the method.

7. The method of claim 1, wherein the modifiers define objects in the communication network which are the object of interest for the analyzing of the communication network and include at least one of i) a point in time, ii) a time interval, iii) the identities related to a specific device, iv) a specific kind of identities, and v) a specific kind of relation between the identities.

8. The method of claim 7, wherein the modifiers comprise IP numbers and DNS addresses of the identifiers and relations connecting the IP numbers and the DNS addresses of the identifiers.

9. The method of claim 7, wherein the modifiers comprise different points in time and the identity graphs presents a sequence of the connections of the of communication network over the different points in time.

10. A device arrangement for analyzing relations between taps of a communication device in a packet connected communication network and the communication network, comprising:
 a communication device connected to the communication network, the communications device comprising at least one tap, the tap arranged for gathering up traffic information in the communication network, the tap examining header information of connections of the communication network; and
 a data storage unit storing the information gathered by the tap, the tap connected to the data storage unit, the tap and the data storage unit together defining a network probe, the network probe being one of i) a physical device and ii) a computer unit,
 the network probe arranged for observing connections of the communication network with the network probe, each connection travels in the communication network and has header information describing the connection, the header information including an identity of the connection and relations to other identities, wherein the observing the connections comprises the tap i) passively analyzing IP packets and association logs received to the tap, the association logs being a description of an observed connection of the communication network, the description being searchable for identities, from the IP packets and association logs, locating the header information of the observed connections, ii) using the located header information to determine the identities of the observed connections and the relations between the observed connections, and iii) saving at least a part of the located header information, the identities, and the relations to the data storage unit,
 the network probe modelling the determined identities and relations as identity flows, the identity flows describing i) the identities, ii) the relations of the identities to the other identities, and iii) identity changes, the identity flows being relative to time and place of the connections, and
 a graph-creating unit arranged for using at least some of the identity flows for creating an identity graph for analyzing functioning of the communication network, the identity graph being a graphical presentation of the relations of the identities, with the identities of different places and devices of the communication network being marked in the identity graph, and the relations of the identities to the other identities being marked in the identity graph, the identity graphs describing the communication network depending on from where and when the communication network is observed, wherein the identities and the relations of the identities to the other identities to be included in an identity graph are chosen according to predetermined modifiers, the modifiers defining objects in the communication network which are the object of interest for the analyzing of the communication network.

11. The device arrangement according to claim 10, wherein when identities and the relations between the connections according to the modifiers are not found from the data structure, the graph-creating unit has been arranged to send a request for missing information to the storing unit storing connections of the communication network.

12. The device arrangement according to claim 11, wherein the graph-creating unit is arranged to send a checking request to the storing unit storing the connections of the communication network, which checking request checks whether the storing unit storing the connections of the communication network has stored such identities and their relations fulfilling the modifiers which are not included in the data structure.

13. The device arrangement according to claim 10, characterized in that the network probe is arranged to receive and store in the data structure information sent by the storing unit storing the connections of the communication network.

14. A non-transitory computer-readable data storage medium having recorded thereon a computer program product, the computer product when executed by a computer, controlling the computer to execute a method of:
 gathering up traffic information in the communication network with taps of a communication device connected to the communication network, the taps examining header information of connections of the communication network;
 observing connections of the communication network with the taps, each connection travels in the communication network and has header information describing the connection, the header information including an identity of the connection and relations to other identities, wherein the observing the connections comprises the tap i) passively analyzing IP packets and association logs received to the tap, the association logs being a description of an observed connection of the communication network, the description being searchable for identities, from the IP packets and association logs, locating the header information of the observed connections, and ii) using the located header information to determine the identities of the observed connections and the relations between the observed connections;
 modelling the determined identities and relations as identity flows, the identity flows describing i) the identities, ii) the relations of the identities to the other identities, and iii) identity changes, the identity flows being relative to time and place of the connections; and
 using at least some of the identity flows for creating an identity graph for analyzing functioning of the communication network, the identity graph being a graphical presentation of the relations of the identities, with the identities of different places and devices of the communication network being marked in the identity graph, and the relations of the identities to the other identities being marked in the identity graph, the identity graphs describing the communication network depending on from where and when the communication network is observed, wherein the identities and the relations of the identities to the other identities to be included in an identity graph are chosen according to predetermined modifiers, the modifiers defining objects in the communication network which are the object of interest for the analyzing of the communication network.

15. The non-transitory computer-readable data storage medium according to claim 14, wherein the computer is controlled to analyze information collected from the identities and their relations.

16. The non-transitory computer-readable data storage medium according to claim 14, wherein the computer is controlled to store at least a part of the identities and their relations they have found to data storage.

17. The non-transitory computer-readable data storage medium according to claim 14, wherein the computer is controlled to send collected data either according to predetermined rules or on grounds of a received request.

18. A non-transitory computer-readable data storage medium having recorded thereon a computer program product, the computer product when executed by a computer, controlling the computer to execute a method examining a communication network of:
gathering up traffic information in the communication network with a tap of a communication device connected to the communication network, the tap examining header information of connections of the communication network;
storing the information gathered by the tap in a data storage, the tap connected to the data storage, the tap and the data storage together defining a network probe, the network probe being one of i) a physical device and ii) a computer unit;
observing connections of the communication network with the network probe, each connection travels in the communication network and has header information describing the connection, the header information including an identity of the connection and relations to other identities, wherein the observing the connections comprises the tap i) passively analyzing IP packets and association logs received to the tap, the association logs being a description of an observed connection of the communication network, the description being searchable for identities, from the IP packets and association logs, locating the header information of the observed connections, ii) using the located header information to determine the identities of the observed connections and the relations between the observed connections, and iii) saving at least a part of the located header information, the identities, and the relations to the data storage;
with the network probe, modelling the determined identities and relations as identity flows, the identity flows describing i) the identities, ii) the relations of the identities to the other identities, and iii) identity changes, the identity flows being relative to time and place of the connections; and
using at least some of the identity flows for creating an identity graph for analyzing functioning of the communication network, the identity graph being a graphical presentation of the relations of the identities, with the identities of different places and devices of the communication network being marked in the identity graph, and the relations of the identities to the other identities being marked in the identity graph, the identity graphs describing the communication network depending on from where and when the communication network is observed, wherein the identities and the relations of the identities to the other identities to be included in an identity graph are chosen according to predetermined modifiers, the modifiers defining objects in the communication network which are the object of interest for the analyzing of the communication network.

19. The non-transitory computer-readable data storage medium according to claim 18, wherein the computer is controlled to receive data about identities and their relations sent by the storage unit for storing connections of the communication network.

20. The non-transitory computer-readable data storage medium to claim 18, wherein the computer is controlled for creating a data structure from the identities and their relations of the examined communication network.

21. The non-transitory computer-readable data storage medium according to claim 18, wherein the computer is controlled to receive modifiers which define the identities and their relations that are to be included in an identity graph analysing the communication network.

22. The non-transitory computer-readable data storage medium according to claim 18, wherein the computer is controlled to send a request to the storage unit for storing the connections of communication network if the data structure does not contain identities and their relations according to the modifiers.

23. The non-transitory computer-readable data storage medium according to claim 18, wherein the computer is controlled to send a checking request to the storage unit for storing the connections of the communication network in which checking request to the storage unit for storing the connections of the communication network a request to check if their data storages contain such identities and their relations that fulfill the modifiers that the data structure does not have is presented.

24. The non-transitory computer-readable data storage medium according to claim 18, wherein the computer is controlled to passively search for flow identities and relations between the flow identities from the identity flow of the communication network from the header information of packets relayed in the communication network or the description of packets being analyzed.

25. The non-transitory computer-readable data storage medium according to claim 18, wherein the computer is controlled to create an identity graph for analysing the communication network in which identity graph the identities and their relations to be included in the identity graph are chosen according to the given modifiers.

26. The non-transitory computer-readable data storage medium according to claim 18, wherein the computer is controlled to create identity graphs for analysing the communication network which identity graphs present the temporal or local changes of identities and relations between them in one tap or between two or more taps.

27. The non-transitory computer-readable data storage medium according to claim 18, wherein the computer executing said method is located outside the examined communication network.

* * * * *